United States Patent
May

(10) Patent No.: US 10,448,244 B2
(45) Date of Patent: Oct. 15, 2019

(54) DEPLOYMENT AND CONFIGURATION OF ACCESS POINTS

(71) Applicant: Fortinet, Inc., Sunnyvale, CA (US)

(72) Inventor: Robert A. May, North Vancouver (CA)

(73) Assignee: Fortinet, inc., Sunnyvale, CA (US)

( * ) Notice: Subject to any disclaimer, the term of this patent is extended or adjusted under 35 U.S.C. 154(b) by 647 days.

(21) Appl. No.: 14/698,437

(22) Filed: Apr. 28, 2015

(65) Prior Publication Data

US 2016/0323810 A1 Nov. 3, 2016

(51) Int. Cl.
*H04W 12/06* (2009.01)
*H04L 12/46* (2006.01)
*H04W 24/02* (2009.01)
*H04W 76/10* (2018.01)
*H04W 88/08* (2009.01)
*H04W 84/12* (2009.01)

(52) U.S. Cl.
CPC ............. *H04W 12/06* (2013.01); *H04L 12/46* (2013.01); *H04L 12/4625* (2013.01); *H04W 24/02* (2013.01); *H04W 76/10* (2018.02); *H04W 84/12* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2012/0201232 A1* | 8/2012 | Velusamy | ............. | H04W 24/02 370/338 |
| 2013/0235859 A1* | 9/2013 | Sun | ........................ | H04W 48/08 370/338 |
| 2014/0115480 A1* | 4/2014 | Lundgren | ............... | G06F 9/451 715/733 |
| 2015/0128211 A1* | 5/2015 | Kirner | .................... | H04L 63/10 726/1 |
| 2015/0237519 A1* | 8/2015 | Ghai | .................... | H04W 24/10 380/270 |

\* cited by examiner

*Primary Examiner* — Peter Chen
*Assistant Examiner* — Jeff Banthrongsack
(74) *Attorney, Agent, or Firm* — Jaffery Watson Mendonsa & Hamilton, LLP

(57) ABSTRACT

Systems and methods for facilitating automated configuration and deployment of APs are provided. According to one embodiment, prior to deployment of a wireless access point (AP) within a private network, a cloud service receives a unique identifier associated with the AP and information regarding a network controller within the private network by which the AP will be managed. A mapping is stored by the cloud service between the unique identifier and the information regarding the network controller. Responsive to deployment within the private network, automated configuration processing is performing by the AP, including: (i) establishing a connection with the cloud service; (ii) querying the cloud service for the information regarding the network controller; (iii) configuring itself with the information regarding the network controller; and (iv) establishing a connection to the network controller.

7 Claims, 7 Drawing Sheets

DEPLOYMENT AND CONFIGURATION OF ACCESS POINTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2015, Fortinet, Inc.

BACKGROUND

Field

Embodiments of the present invention generally relate to computer networking and wireless network Access Points (APs). More particularly, embodiments of the present invention relate to an efficient mechanism for deployment and configuration of APs.

Description of the Related Art

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices, including laptop computers, tablet computers, smartphones and network appliances and the like. Typically, APs provide a port for wireless devices to access a network. At a business, several APs can be spread throughout a location (e.g., an enterprise campus) so that employees have Internet access as they travel around to different meeting rooms and even different buildings of a campus. APs are typically managed by one or more network controllers that configure the functioning/routing/processing of transmitted/received packets and allied network access control parameters of the APs.

When a customer/user first unpacks an AP received from the manufacturer or reseller, the AP is not aware of the network controller that should manage it within the network environment in which the AP will become a part. As such, the AP must typically be explicitly configured, through say a command line interface (CLI), to specify an appropriate/desired network controller and enable communication between the AP and the network controller. This configuration process takes time and generally requires a network administrator or someone with technical knowledge.

There is therefore a need for a system and method that enables efficient deployment and configuration of APs.

SUMMARY

Systems and methods are described for facilitating configuration and deployment of APs. According to one embodiment, a method is provided for automated configuration of a wireless access point (AP) upon deployment within a private network. Prior to deployment, a cloud service receives a unique identifier associated with the AP and information regarding a network controller within the private network by which the AP will be managed when the AP is deployed within the private network. A mapping is stored by the cloud service between the unique identifier and the information regarding the network controller. Responsive to deployment within the private network, automated configuration processing is performing by the AP, including: (i) establishing a connection with the cloud service; (ii) querying the cloud service for the information regarding the network controller; (iii) configuring itself with the information regarding the network controller; and (iv) establishing a connection to the network controller.

Other features of embodiments of the present invention will be apparent from the accompanying drawings and from the detailed description that follows.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
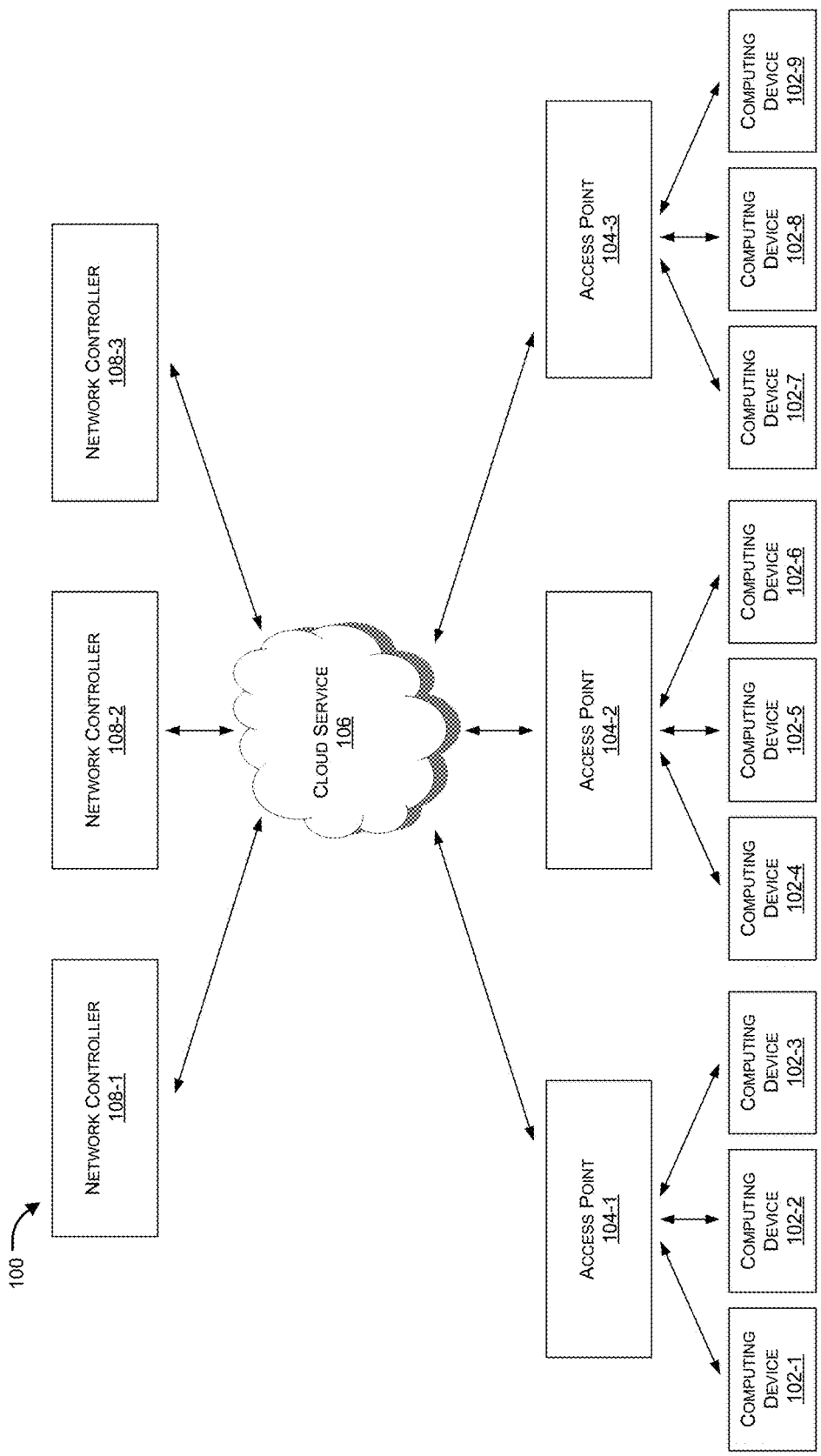
FIG. 1 illustrates an exemplary network environment in which embodiments of the present invention may be utilized.

Systems and methods are described for facilitating configuration and deployment of APs. Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

According to one embodiment, a method of configuring and deploying APs is provided including the steps of receiving, by a cloud service, a unique identifier associated with a wireless access point (AP) and information regarding a network controller within a private network by which the AP can be managed when the AP is deployed within the private network. The method can further include the step of storing, by the cloud service, a mapping between the unique identifier and the information regarding the network controller. Furthermore, the method can include the step of, responsive to deployment within the private network, performing, by the AP, automated configuration processing including establishing a connection with the cloud service, querying the cloud service for the information regarding the network controller, configuring itself with the information regarding the network controller, and establishing a connection to the network controller.

According to another embodiment, a method of configuring and deploying APs includes the steps of enabling a user to, through a first computing device, associate at least one unique identifier of at least one access point (AP) with a network controller before activation of the at least one AP, activating the at least one AP by allowing the AP to retrieve the network controller that it is associated with based on the association of its unique identifier, and connecting the at least one AP with the network controller to enable the network controller to manage the at least one AP.

According to another embodiment, association information between the unique identifier of the AP and the network controller can be stored in cloud such that during activation, the AP can access the association information stored at the cloud to retrieve the network controller that it is associated with. In an aspect, during activation, the cloud can receive connection confirmation from the AP, retrieve unique identifier of the AP, and identify the network controller that the AP is associated with to enable connection of the AP with the network controller. According to one embodiment, the unique identifier can be any or a combination of a serial code, registration code/number, or a number that uniquely identifies the AP.

In an aspect, after connection establishment between the AP and the network controller, the AP can directly communicate with the network controller, bypassing the cloud. In yet another aspect, the first computing device can provide an interface to the user to select the unique identifier of the AP and associate the selected unique identifier with the network controller, wherein the network controller can be selected based on any or a combination of IP address of the network controller and hostname of the network controller. In yet another aspect, switching ON of the at least one AP can directly connect the AP with the cloud and/or to the location where its association information with the network controller is stored.

According to an embodiment, a system is provided having a pre-deployment AP to network controller assignment module configured to enable a user to, through a first computing device, associate at least one unique identifier of at least one access point (AP) with a network controller before activation of the at least one AP. The system can further include an AP unit configuration module configured at the AP to activate the at least one AP by allowing the AP to retrieve the network controller that it is associated with based on the association of its unique identifier. The system can further include an AP unit connection module configured to enable connection between the at least one AP and the network controller to enable the network controller to manage the at least one AP.

FIG. 1 illustrates an exemplary network environment 100 in which embodiments of the present invention may be utilized. As can be seen, exemplary environment 100 can include one or more client devices 102-1, 102-2 and so on, which may be collectively referred to as client/user/end devices 102 hereinafter, that are operatively coupled to one or more access points (APs) such as 104-1, 104-2, and 104-3, to access one or more external/internal networks and services/applications rendered thereby. One such exemplary service can be a cloud service 106 that can be configured to enable assignment of a network controller 108 (selected from one or more network controllers such as 108-1, 108-2, and so on) to an AP 104, wherein the assigned network controller 108 can manage the AP 104. Network controller 108 can, for instance, be configured to perform configuration, fault monitoring, and performance monitoring functions, for the APs 104 that it is assigned to by, for instance, automatically downloading required configuration information to APs 104 at power-up/power cycle, automatically upgrading of APs 104 to latest software loads and/or firmware versions, remote commissioning of APs 104, continuous real time monitoring of network operation, remote diagnosis of APs, performing client authentication, among other like functions that are well known in the art.

According to one embodiment, the network controller 108 can be implemented by the use of one or more general-purpose computers. Client devices 102, on the other hand, can include personal computers, such as laptop computers or handheld palm/personal digital assistant (PDA) devices or smart/mobile devices. Each network controller 108, AP 104, and client device 102 can include a microprocessor, which can be any type of processor, such as, for example, any type of general purpose microprocessor or microcontroller, a digital signal processing (DSP) processor, an application-specific integrated circuit (ASIC), a programmable read-only memory (PROM), an erasable programmable read-only memory (EPROM), or the like. Each network controller 108, AP 104, and client device 102 can also include computer memory, such as, for example, random-access memory (RAM) or EEPROM/Flash. However, computer memory of network controller 108 can be any type of computer memory or any other type of electronic storage medium that is located either internally or externally to the network controller 108, such as, for example, read-only memory (ROM), compact disc read-only memory (CDROM), electro-optical memory, magneto-optical memory, an electrically-erasable programmable read-only memory (EEPROM), or the like.

According to one embodiment, cloud service 106 can receive a unique identifier associated with a wireless access point (AP) such as say 104-2, and also receive information regarding a network controller say 108-3 within a private network by which the AP 104-2 will be managed when the AP 104-2 is deployed within the private network. Mapping between such received information of the unique identifier of the AP 104-2 and the associated network controller 108-2 can be stored by the cloud service 106. Once stored, when the AP 104-2 is deployed/switched ON within the private network, the AP 104-2 can be configured to automatically configure itself by establishing a connection with the cloud service 106, querying the cloud service 106 for the information regarding the network controller 108-3, configuring itself with the information regarding the network controller 108-3, and establishing a connection with the network controller 108.

Therefore, prior to activation/deployment of AP 104 itself, cloud service 106 or any other like computing device/central server stores the mapping between the unique identifier of AP 104 and network controller 108 that AP 104 is to be managed by. After AP 104 is deployed, it retrieves information regarding network controller 108 that it is to be managed by and directly connects with network controller 108 using its IP address and/or host name, for example.

According to one embodiment, the unique identifier of AP 104 can be any identifier such as manufacturing code, serial number, or any other code that uniquely represents each AP 104 and that can be used by cloud service 106 to map/associate a network controller 108 to AP 104.

In an exemplary implementation, a customer can first setup a cloud service account, through which the customer can identify one or more of its AP units 104. Such identification can be done using a special code that can be translated to AP serial numbers and can uniquely represent APs 104. Such special codes can, in an instance, be received by the customer after it places its order. In an embodiment, in addition to identifying AP units 104, the customer/user can also designate IP address or hostname of the network controller 108 that will manage the one or more AP unit 104. For instance, a serial code such as AA-652466 of AP 104-3 can be associated with IP address 45.67.89.123 of network controller 108-1.

During deployment/configuration, responsive to AP unit 104 first being powered on and connected to Internet, it can establish a connection with cloud service 106. Cloud service 106 can either directly retrieve or lookup the serial number of AP 104 or AP 104 can send its serial number to cloud service 106, based on which cloud service 106 can lookup information (e.g., information regarding network controller 108) mapped to the serial number. Once found, cloud service 106 can send back the mapping information, identifying network controller 108. Based on this information, AP 104 can configure itself with that IP/domain name of the controller 108 and establish a connection to the controller (disabling management with the cloud service 106).

Figure 2:
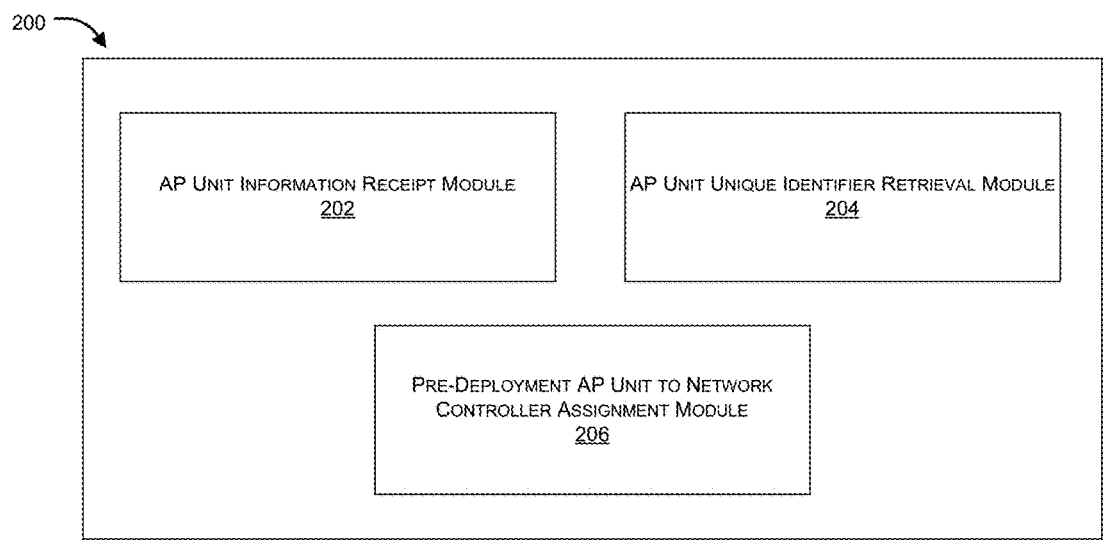
FIG. 2 illustrates exemplary functional modules of a cloud service in accordance with an embodiment of the present invention.

FIG. 2 illustrates exemplary functional modules of a cloud service 200 in accordance with an embodiment of the present invention. Those skilled in the art will appreciate that although embodiments of the present invention are described with reference to use of a cloud service, such an architecture/arrangement is merely exemplary, and other computing devices/architectures/arrangements that can receive information pertaining to AP unit(s) and network controller(s), and can enable deployment/configuration of the AP units are within the scope of the present disclosure.

According to one embodiment, cloud service 200 can be configured to include an AP unit information receipt module 202, an AP unit unique identifier retrieval module 204, and a pre-deployment AP unit to network controller assignment module 206. In an embodiment, the AP unit information receipt module 202 can be configured to enable cloud service 200 to receive information relating to at least one AP unit, wherein such information can include, but is not limited to, date of purchase of the AP unit, configuration/settings for the AP unit, model number and purchase details of the AP unit, and a unique identifier/serial number/manufacturing code associated with the AP unit, among any other defined information.

In one embodiment, AP unit unique identifier retrieval module 204 can be configured to enable cloud service 200 to retrieve the unique identifier of the AP unit. Such unique identifier can be a serial number of the AP unit or a code otherwise embedded/associated by the manufacturer with the AP unit that can uniquely represent the AP.

According to one embodiment, pre-deployment AP unit to network controller assignment module 206 can be configured to enable cloud service 200 to receive, from say the user/customer/administrator, information regarding the network controller that is expected to manage the AP unit. Such network controller information can be received in the form of, for instance, an IP address or hostname of the controller. Once received, module 206 can further be configured to map the unique address of the AP unit with the network controller and store such mapping, which as can be appreciated, can be done before the AP unit is deployed/switched ON. In an aspect, the network controller can be automatically determined by cloud service 200. In sum, module 206 can be configured to enable the customer/user to, through a first computing device/platform, such as cloud service 200, associate at least one unique identifier of at least one access point (AP) with a network controller before activation of the at least one AP.

Figure 3:
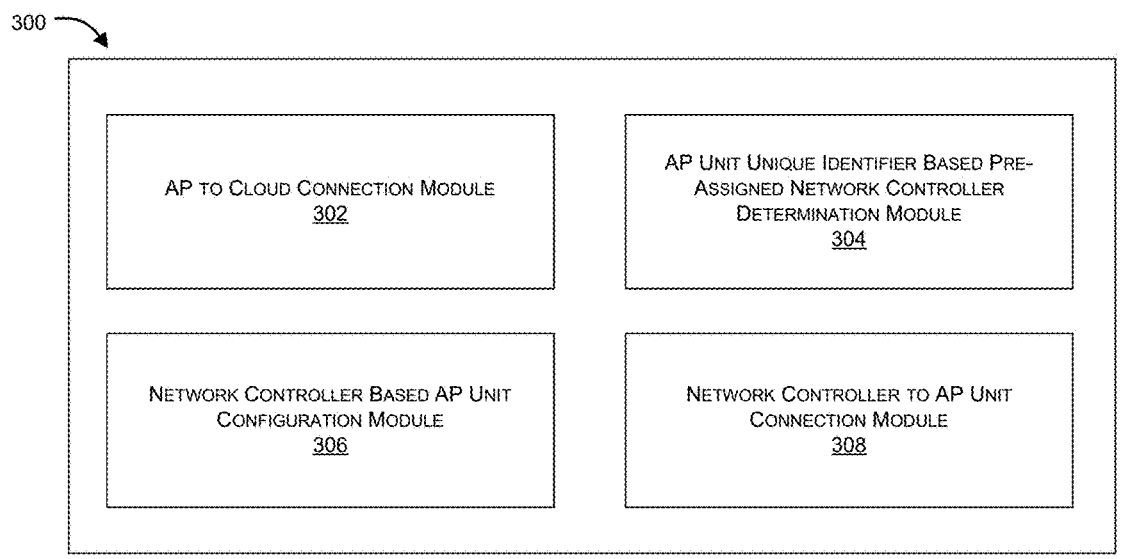
FIG. 3 illustrates exemplary functional modules of an AP in accordance with an embodiment of the present invention.

FIG. 3 illustrates exemplary functional modules of an AP 300 in accordance with an embodiment of the present invention. In an embodiment, AP 300 can include an AP to cloud connection module 302, an AP unit unique identifier based pre-assigned network controller determination module 304, a network controller based AP unit configuration module 306, and a network controller to AP unit connection module 308.

In an embodiment, AP to cloud connection module 302 can be configured to detect when AP unit 300 is first plugged in and connected to Internet so as to automatically and/or after manual intervention establish a connection with a cloud service (e.g. cloud service 106 or 200). In an instance, AP unit 300, once connected to the Internet, can automatically detect the existence of an account with the cloud service and connect with same, if desired/configured after authentication.

In one embodiment, AP unit unique identifier based pre-assigned network controller determination module 304 can be configured to enable AP unit 300, once connected to the cloud service, to send its serial number (or other information uniquely associated with its serial number, e.g., a special code that can be translated to the serial number) to the cloud service so as to enable the cloud service to identify a mapping of the serial number to a network controller within the network in which AP 300 has been deployed. Once identified, the cloud service can send back, to AP unit 300, the mapping information, which includes details (e.g., an IP address and/or hostname) of the network controller by which the AP unit is to be managed.

According to one embodiment, network controller based AP unit configuration module 306 can be configured to enable AP unit 300 to automatically and/or after manual intervention configure itself with the IP/domain name of the network controller, based on which the network controller to AP unit connection module 308 can establish a connection between AP unit 300 and the network controller, and also optionally disable the connection between AP unit 300 and the cloud service. Once a connection is established with the network controller, AP unit 300 can redirect its control communications to the network controller so as to enable the network controller to manage the functions/performance of AP unit 300.

Figure 4A:
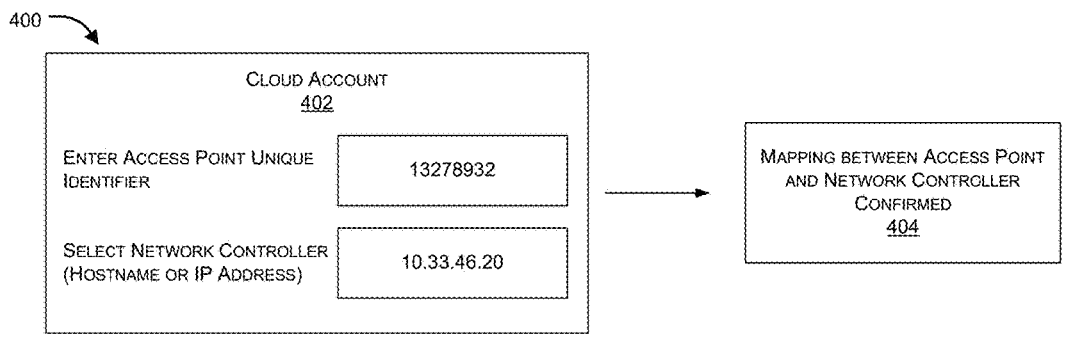
FIGS. 4A and 4B illustrate exemplary block diagrams showing deployment and configuration of an access point in accordance with an embodiment of the present invention.
Figure 4B:
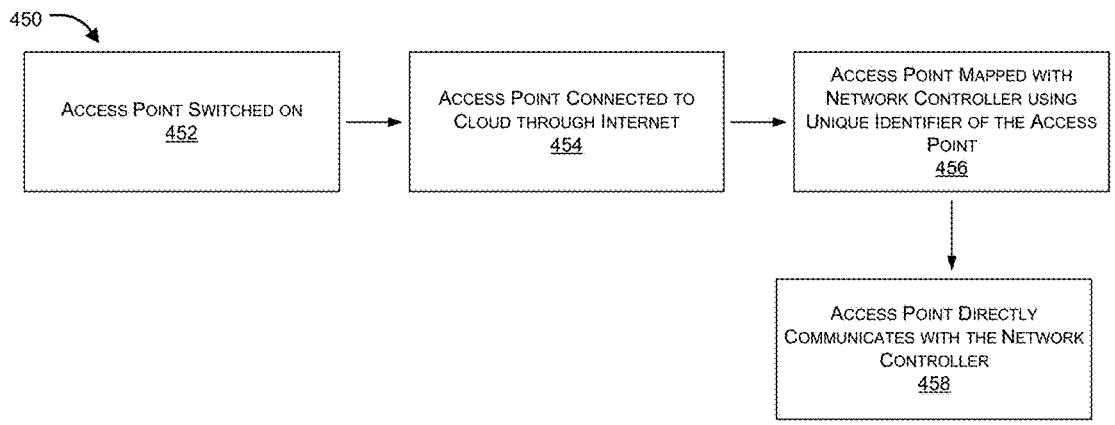

FIGS. 4A and 4B illustrate exemplary block diagrams 400 and 450 showing deployment and configuration of an access point in accordance with an embodiment of the present invention. FIG. 4A shows an exemplary representation of a cloud service interface 400 showing a cloud account 402 of a user/customer that can enable association of an AP with a network controller, and can also store the mapping therebetween prior to activation of the AP. As shown, interface 402 can expect the customer/user to enter a unique identifier/code/number of the AP such as say a manufacturer assigned serial code/number 13278932 (or a special code that can be translated into the serial number) and also enable the user/customer to enter information associated with a network controller that should manage the AP. Such network controller information can include the hostname of the controller or its IP address, such as 10.33.46.20, for instance. A mapping between the AP and the network controller can then be stored at 404 in a local/remote database/repository that is accessible to the cloud service.

FIG. 4B, on the other hand, illustrates steps by which the AP unit (upon being switched on for the first time) can automatically discover and connect with the network controller. At step 452, the access point determines it has been switched on for the first time. At step 454, the access point makes a connection to the Internet. At step 456, the AP unit is connected to the cloud service or a remote device that stores the mapping between the unique identifier/serial number of the AP unit and the network controller that is configured to manage the AP unit. Responsive to receiving a unique identifier of the AP, the cloud service/remote device can retrieve corresponding information regarding a network controller to which the AP has been assigned and send the network controller information to the AP unit, based on which, as shown in 458, the AP unit can configure itself and directly start communicating with the network controller.

Figure 5:
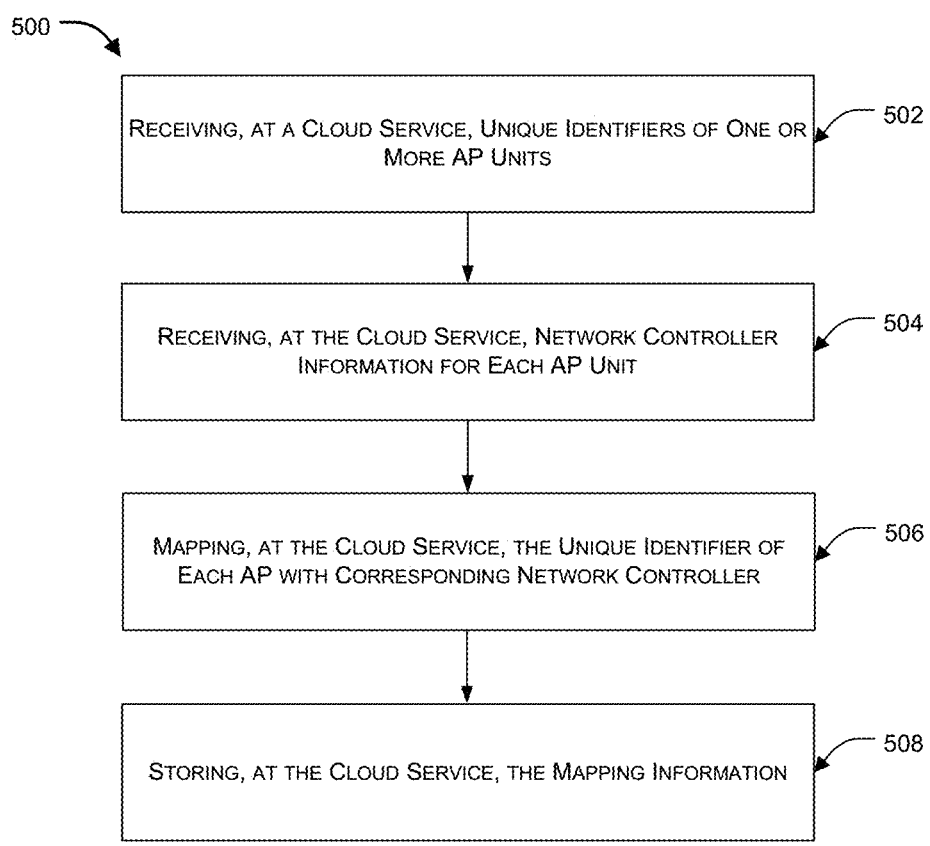
FIG. 5 is a flow diagram illustrating pre-deployment AP-controller association processing in accordance with an embodiment of the present invention.

FIG. 5 is a flow diagram 500 illustrating pre-deployment AP-controller association processing in accordance with an embodiment of the present invention. At step 502, a cloud service or any other remotely/centrally accessible device can receive unique identifiers of one or more AP units that need to be managed by one or more network controllers. At step 504, the cloud service can receive the network controller that each AP unit is to be associated with upon deployment, after which, at step 506, the cloud service can map the unique identifier of each AP unit with its corresponding network controller. Such mapping information can then be stored in an accessible database/memory/repository at step 508.

Figure 6:
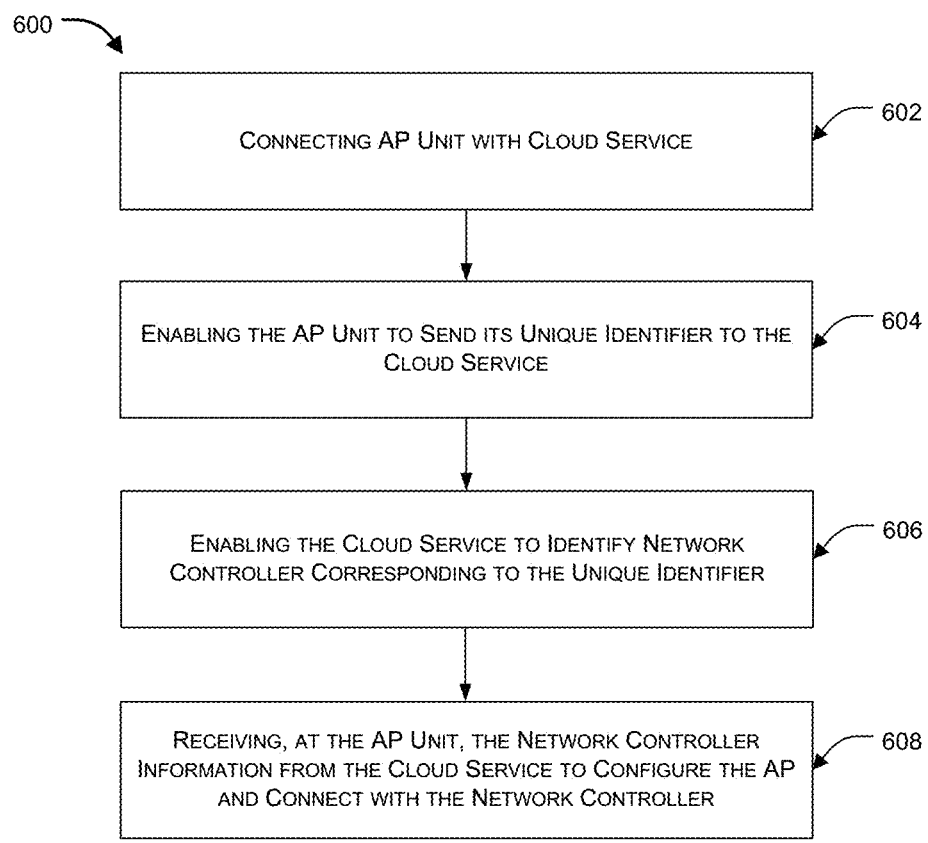
FIG. 6 is a flow diagram illustrating automated AP configuration processing in accordance with an embodiment of the present invention.

FIG. 6 is a flow diagram illustrating automated AP configuration processing in accordance with an embodiment of the present invention. At step 602, an AP can be switched on to connect with the cloud service through an external/internal network such as the Internet. At step 604, upon connection, the cloud service can retrieve the unique identifier of the AP unit, and at 606, can retrieve the lookup table/mapping information to identify the network controller that is expected to manage the AP unit based on the retrieved unique identifier. At step 608, the network controller information/identifier can be sent by the cloud service to the AP unit, using which the AP unit can configure itself and connect with the network controller to enable management of the AP unit by the network controller.

Figure 7:
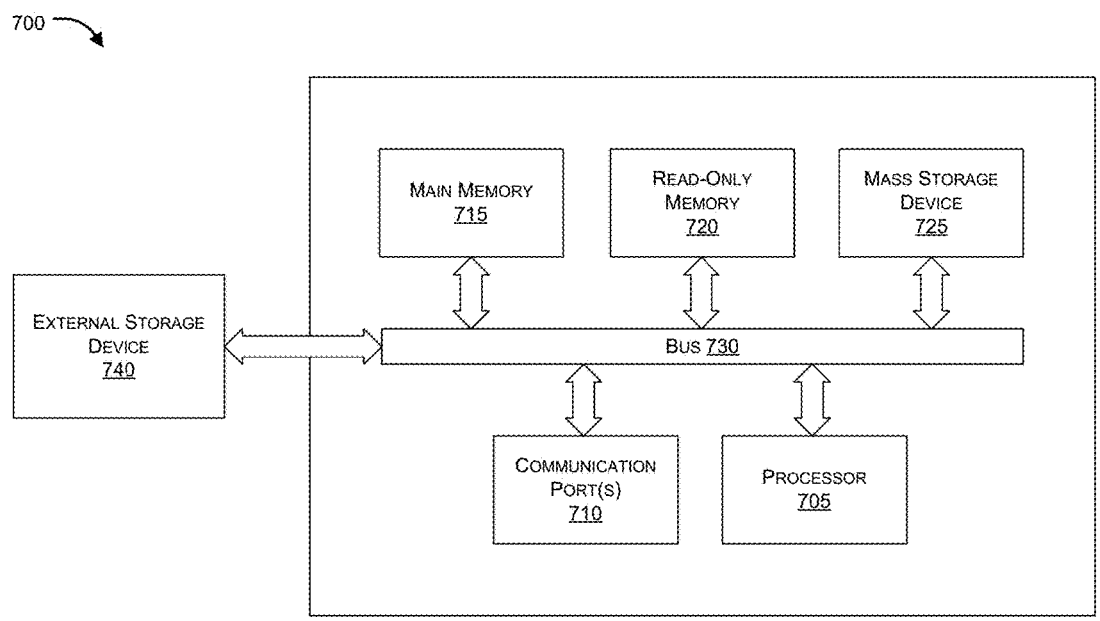
FIG. 7 is an exemplary computer system in which or with which embodiments of the present invention may be utilized.

FIG. 7 is an exemplary computer system 700 in which or with which embodiments of the present invention may be utilized. Computer system 700 may represent or form a part of a cloud service computer system, an AP or a network controller.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with embodiments of the present invention.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "determining", "adjusting", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should therefore be determined with reference to the appended claims, along with the full scope of equivalents to which such claims are entitled.

What is claimed is:
1. A method comprising:
before deployment of a wireless access point (AP) within a private network, enabling an administrator of the private network to, through a first computing device, associate an identifier that uniquely identifies the AP with a network controller within the private network by which the AP will be managed when the AP is deployed within the private network;
receiving, by a cloud service, the identifier that uniquely identifies the wireless access point (AP) and information regarding the network controller within private network by which the AP will be managed when the AP is deployed within the private network;
storing, by the cloud service, a mapping between the identifier and the information regarding the network controller; and
responsive to deployment of the AP within the private network, performing, by the AP, automated configuration processing including:
establishing a connection with the cloud service;
querying the cloud service for the information regarding the network controller;
responsive to receiving the information regarding the network controller from the cloud service, configuring the AP with the information regarding the network controller; and enabling the network controller to manage the AP by establishing a control communication connection between the AP and the network controller through the private network.

2. The method of claim 1, wherein information associating the identifier with the information regarding the network controller is stored by the cloud service, and wherein, during activation of the AP, the AP accesses the information stored by the cloud service to retrieve the information regarding the network controller.

3. The method of claim 2, wherein the cloud service receives confirmation regarding establishment of the control communication connection from the AP, receives the identifier of the AP, and identifies the network controller with which the AP is associated to facilitate said establishing a control communication connection.

4. The method of claim 3, wherein after said establishing a control communication connection between the AP and the network controller, the AP directly communicates with the network controller, bypassing the cloud service.

5. The method of claim 1, wherein the identifier comprises any or a combination of a serial number/code, registration number/code and a special code associated with the AP and which can be translated to the serial number/code or the registration number/code of the AP.

6. The method of claim 1, wherein the first computing device provides an interface to the administrator from which to select the identifier and associate the selected identifier with the network controller.

7. The method of claim 1, wherein the information regarding the network controller comprises any or a combination of an Internet Protocol (IP) address of the network controller and a hostname of the network controller.

* * * * *